(12) United States Patent
Seo et al.

(10) Patent No.: US 8,494,497 B2
(45) Date of Patent: Jul. 23, 2013

(54) METHOD FOR TRANSMITTING A HAPTIC FUNCTION IN A MOBILE COMMUNICATION SYSTEM

(75) Inventors: Jong Won Seo, Gyeonggi-do (KR); Sang Hyeon Yoon, Seoul (KR); Seung Yeob Lee, Gyeonggi-do (KR); Hyun Jun Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 457 days.

(21) Appl. No.: 12/775,542

(22) Filed: May 7, 2010

(65) Prior Publication Data
US 2010/0285784 A1 Nov. 11, 2010

(30) Foreign Application Priority Data
May 8, 2009 (KR) ........................ 10-2009-0040012

(51) Int. Cl.
*H04M 3/42* (2006.01)

(52) U.S. Cl.
USPC ...... 455/414.1; 455/567; 455/415; 455/556.1

(58) Field of Classification Search
USPC ............................ 455/414.1, 567, 415, 556.1
See application file for complete search history.

(56) References Cited

U.S. PATENT DOCUMENTS

| | | | | |
|---|---|---|---|---|
| 5,815,081 A * | 9/1998 | Motohashi | .................... | 340/7.58 |
| 6,785,563 B2 * | 8/2004 | Tsukamoto | .................... | 455/567 |
| 6,885,876 B2 * | 4/2005 | Aaltonen et al. | ........... | 455/550.1 |
| 6,963,762 B2 * | 11/2005 | Kaaresoja et al. | ............. | 455/567 |
| 7,136,894 B2 * | 11/2006 | Britt, Jr. | ........................ | 709/201 |
| 7,148,875 B2 * | 12/2006 | Rosenberg et al. | ........... | 345/156 |
| 7,369,115 B2 * | 5/2008 | Cruz-Hernandez et al. | .. | 345/156 |
| 7,779,166 B2 * | 8/2010 | Grant et al. | ....................... | 710/5 |
| 7,791,588 B2 * | 9/2010 | Tierling et al. | ............... | 345/156 |
| 7,792,264 B2 * | 9/2010 | Pfleging et al. | ........... | 379/207.16 |
| 7,801,569 B1 * | 9/2010 | Zellner | .......................... | 455/567 |
| 7,979,146 B2 * | 7/2011 | Ullrich et al. | ................... | 700/94 |
| 8,059,088 B2 * | 11/2011 | Eid et al. | ........................ | 345/156 |
| 8,260,972 B2 * | 9/2012 | Cruz-Hernandez et al. | ...... | 710/5 |
| 2002/0165013 A1 * | 11/2002 | Bright et al. | .................. | 455/567 |
| 2004/0147814 A1 * | 7/2004 | Zancho et al. | ................ | 600/300 |
| 2004/0203631 A1 * | 10/2004 | Wong et al. | ................ | 455/414.1 |
| 2005/0136987 A1 * | 6/2005 | Forlenza et al. | .............. | 455/567 |
| 2006/0066569 A1 * | 3/2006 | Eid et al. | ........................ | 345/156 |
| 2006/0199601 A1 * | 9/2006 | Cho | ............................... | 455/466 |
| 2007/0176742 A1 * | 8/2007 | Hofmann et al. | .............. | 340/7.6 |
| 2008/0096535 A1 * | 4/2008 | Kim | ........................... | 455/414.1 |
| 2008/0153554 A1 * | 6/2008 | Yoon et al. | ..................... | 455/567 |
| 2008/0186152 A1 * | 8/2008 | Kyung et al. | ............... | 340/407.1 |
| 2009/0088204 A1 * | 4/2009 | Culbert et al. | ............. | 455/556.1 |

(Continued)

*Primary Examiner* — Charles Shedrick
(74) *Attorney, Agent, or Firm* — Cha & Reiter, LLC (57) ABSTRACT

Disclosed is a method and system for transmitting a haptic function within a communication system. The method includes: inserting, by a first mobile terminal, haptic information corresponding to a selected vibration into a call setup request message and transmitting the call setup request message to a network server when a haptic service is executed; analyzing, by the network server, the haptic information, generating a vibration code corresponding to the haptic information, inserting the vibration code into the call setup request message, and transmitting the call setup request message to at least one second mobile terminal; and executing, by the second mobile terminal, a corresponding haptic function according to the vibration code included in the call setup request message when receiving the call setup request message.

10 Claims, 10 Drawing Sheets

U.S. PATENT DOCUMENTS

2009/0215432 A1* 8/2009 Matsuoka .................. 455/412.2
2009/0311999 A1* 12/2009 Sarkar et al. .................. 455/415
2011/0085687 A1* 4/2011 Edgar .......................... 381/315
2011/0169622 A1* 7/2011 Billmaier et al. .......... 340/407.1

* cited by examiner

METHOD FOR TRANSMITTING A HAPTIC FUNCTION IN A MOBILE COMMUNICATION SYSTEM

CLAIM OF PRIORITY

This application claims, pursuant to 35 USC 119, priority to, and the benefit of the earlier filing date of, that patent application filed in the Korean Patent Office, on May 8, 2009, entitled "Method for Transmitting Haptic Function of Mobile Terminal and System Thereof," and afforded serial number 10-2009-0040012, the contents of which are incorporated by reference herein.

BACKGROUND OF THE INVENTION

1. Field of the Invention

The present invention relates to a mobile terminals, and more particularly method and system of utilizing a haptic function by recipient mobile terminals.

2. Description of the Related Art

With the development of information and communication technologies, a mobile terminal has become a necessity for many people, because of the mobile terminal's mobility, miniaturization, portability, and capability of storing/reproducing various application programs. In addition, as mobile terminals have become more widely used, mobile communication providers are providing many new and additional services in order to satisfy various needs of the user community. For example, mobile communication providers typically provide users of mobile terminals with services such as voice calling, a text messaging, data communication, various multimedia services and a video calling through the use of the high-speed data communication technology.

Although various additional services that can be used through a mobile terminal are provided, the user of the mobile terminal can identify reception of a call only through an output means, such as ring tones, video, vibration, lamp, etc. which have been set in the mobile terminal, when the call is received.

SUMMARY OF THE INVENTION

Accordingly, the present invention provides a haptic function transmission method and system for a mobile terminal, by which a sender can set a haptic function through a network server and transmit the haptic function to a recipient mobile terminal, so that the haptic function can be executed in the recipient mobile terminal.

In addition, the present invention provides a haptic function transmission method and system for a mobile terminal, by which a sender mobile terminal can set and transmit a haptic function to the recipient mobile terminal, and the corresponding haptic function can be executed in the recipient mobile terminal.

In accordance with an aspect of the present invention, there is provided a method for utilizing a haptic function of a mobile terminal, including: inserting, by a first mobile terminal, haptic information corresponding to a selected vibration into a call setup request message and transmitting the call setup request message to a network server when a haptic service is executed; analyzing, by the network server, the haptic information, generating a vibration code corresponding to the haptic information, inserting the vibration code into the call setup request message, and transmitting the call setup request message to at least one second mobile terminal; and executing, by the second mobile terminal, a corresponding haptic function according to the vibration code included in the call setup request message when receiving the call setup request message.

In accordance with another aspect of the present invention, there is provided a method for utilizing a haptic function in a mobile communication system, including: inserting, by a first mobile terminal, a vibration code corresponding to selected vibration into a call setup request message and transmitting the call setup request message to a network server when a haptic service is executed; and executing, by a second mobile terminal, a corresponding haptic function according to the vibration code included in the call setup request message which is received from the network server.

In accordance with another aspect of the present invention, there is provided a system for utilizing a haptic function among mobile terminals, including: a first mobile terminal for inserting haptic information corresponding to selected vibration into a call setup request message and transmitting the call setup request message to a network server when a haptic service is executed; the network server for analyzing the haptic information, generating a vibration code corresponding to the haptic information, inserting the vibration code into the call setup request message, and transmitting the call setup request message to at least one second mobile terminal; and the second mobile terminal for executing a corresponding haptic function according to the vibration code included in the call setup request message when receiving the call setup request message.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. For the purposes of clarity and simplicity, detailed descriptions of well-known functions and structures incorporated herein may be omitted to avoid obscuring the subject matter of the present invention.

According to the present invention, the user can set up a haptic function to be registered or deregistered in a haptic function setup menu in order to apply an embodiment of the present invention. Such a setup can be applied to both a sender mobile terminal and a recipient mobile terminal. Or may be setup through a common interface, such as a company website or central location that provides for programming the mobile terminals. In addition, an exemplary embodiment of the present invention will be described on the assumption that, when a vibration code generated through a network server is transmitted to a recipient mobile terminal, the recipient mobile terminal has been registered for a haptic service in advance.

According to an embodiment of the present invention, when a mobile terminal cannot set up a vibration code, a haptic function is set up through the use of a network server, and when a mobile terminal can set up a vibration code, a vibration code is generated by the mobile terminal itself.

According to an embodiment of the present invention, "haptic information" includes information regarding a vibration condition or mode selected by the user. The haptic information may be included in a specified field of a call setup request message, and be transmitted to a network server. Here, among fields of a call setup request message, the specified field, in which the haptic information is included, may be a User-defined field, a Progress Indicator field, or another field. When the specified field corresponds to a Progress Indicator field, the haptic information may be expressed using assigned code values and when the specified field corresponds to a User-defined field, the haptic information may be expressed using values defined by the user.

A mobile terminal according to an exemplary embodiment of the present invention is a mobile terminal supporting a haptic function, and it is apparent that the present invention may be applied not only to a mobile communication terminal, a Personal Digital Assistant (PDA), a smart phone, an International Mobile Telecommunication 2000 (IMT-2000) terminal, a Code Division Multiple Access (CDMA) terminal, a Global Standard for Mobile Communication (GSM) terminal, a Wideband Code Division Multiple Access (WCDMA) terminal, etc., but also applications thereof.

According to an embodiment of the present invention, a first mobile terminal and a second mobile terminal can perform the same functions. However, in order to facilitate the understanding of the subject matter of the present invention, the following description will be given on a case where the first mobile terminal operates as a sender mobile terminal, and the second mobile terminal operates as a recipient mobile terminal.

Figure 1:
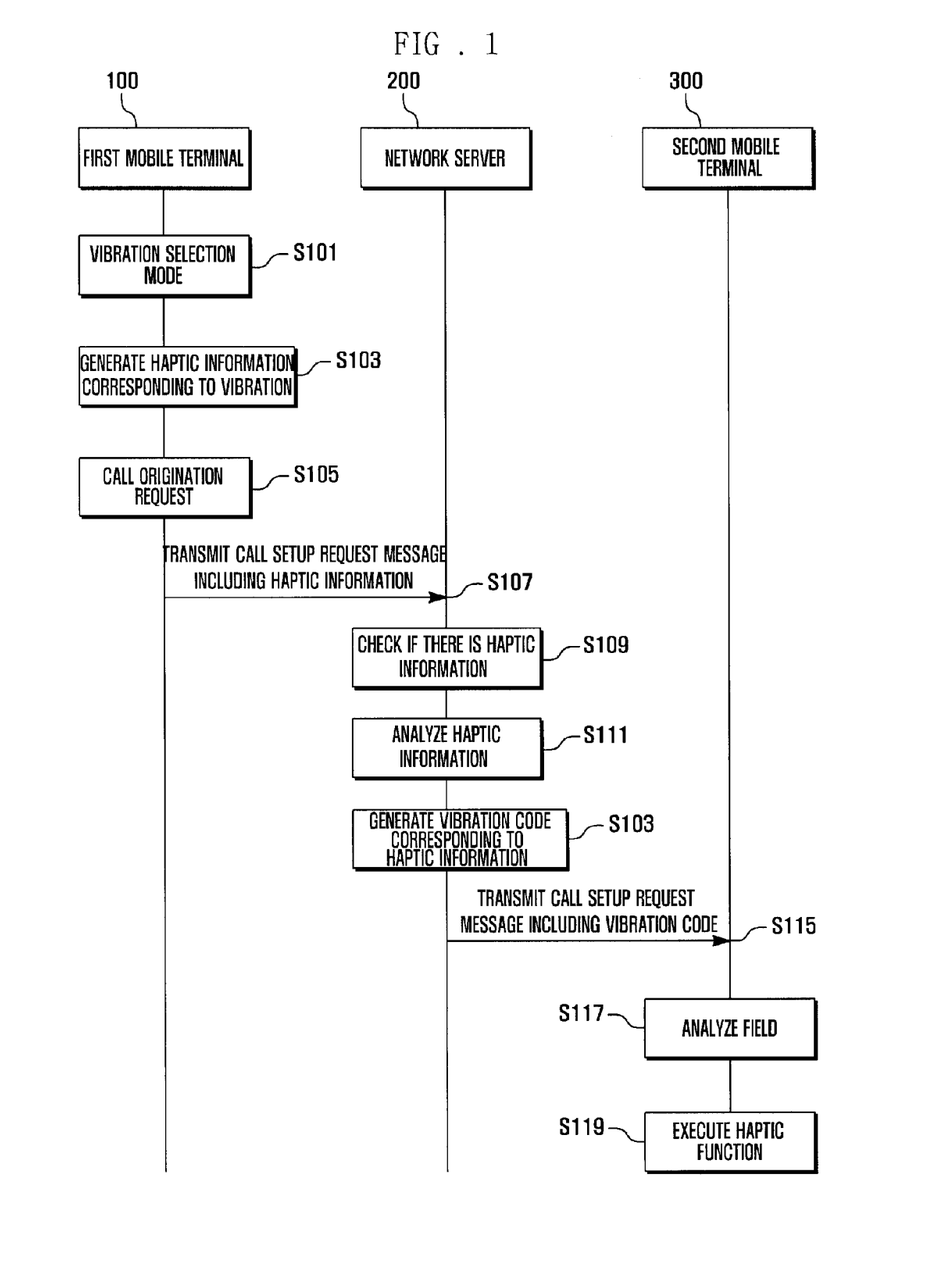
FIG. 1 illustrates a procedure of setting and providing a haptic function through a network server according to an exemplary embodiment of the present invention.

FIG. 1 illustrates a procedure of setting a haptic function through a network server according to an exemplary embodiment of the present invention.

Referring to FIG. 1, a system according to an exemplary embodiment of the present invention may include a first mobile terminal 100, a network server 200, and a second mobile terminal 300. In this case, the first mobile terminal 100 can perform functions of registering for a haptic service, selecting a vibration applied to a haptic function, generating haptic information corresponding to the selected vibration, requesting a call origination, etc. Also, the network server 200 can store an assigned code value of a User-defined field or Progress Indicator field and registration information for a haptic service in a database (DB) (not shown) in order to identify whether or not a call setup request message includes haptic information. In addition, the network server 200 can store haptic function-related information, such as user information of, and/or information on, a mobile terminal requesting a haptic service registration, information on a vibration mode corresponding to haptic information, a vibration code corresponding to the vibration mode information, etc., in the database (DB). In this case, the network server 200 may store data about vibration information in such a manner as to classify the data according to kinds of vibrations in a table, and to match each piece of vibration information to a corresponding vibration code. With this, the network server 200 can analyze haptic information included in a call setup request message, received from the first mobile terminal 100, and generate and transmit a corresponding vibration code to the second mobile terminal 300. Also, the second mobile terminal 300 may analyze a vibration code included in a call setup request message, which has been received from the network server 200, and execute a corresponding haptic function according to an operation mode of the second terminal.

When the first mobile terminal 100 has been registered for a haptic service, the first mobile terminal 100 executes a process for selecting vibration to be used for a haptic function in step S101. In the step of selecting vibration, the user of the first mobile terminal 100 may select a desired vibration according to the degree of urgency of a call origination request, the feeling of the user, a change of the user's preference, etc.

When vibration has been selected, the first mobile terminal 100 can generate haptic information corresponding to the vibration in step S103. In this case, the haptic information may include vibration information set as a 8-bit binary code value. For example, when the user has selected an item to generate vibration at intervals of one second, the first mobile terminal 100 may set its corresponding vibration information to "01010101," and when the user has selected an item to generate vibration at intervals of four seconds, the first mobile terminal 100 may set its corresponding vibration information to "00001000." With the exemplary 8-bit binary code illustrated, up to 256 different vibrations modes may be implemented. However, it would be recognized that the invention claimed is not limited to an 8-bit binary code, but the number of bits may be selected, for example based on the number of bits that are available in the transmission message.

When the haptic information has been generated, the first mobile terminal 100 may sense a call origination request signal input by the user in step S105. In this case, the call origination request signal may include a signal such as an input of a call key or a voice activation signal. Here, a call origination request may be a general voice call request or video call request.

When receiving a call origination request, the first mobile terminal 100 inserts haptic information into a call setup request message and transmits the call setup request message including the haptic information to the network server 200 in step S107. In this case, the haptic information may be included in a specified field of the call setup request message. Here, the specified field may be the Progress Indicator field or the User-defined field among fields of the call setup request message. When the specified field corresponds to the Progress Indicator field, the haptic information may be expressed using assigned code values, as discussed previously. And when the specified field corresponds to the User-defined field, the haptic information may be expressed using values defined by the user.

When receiving the call setup request message, the network server 200 checks whether the call setup request message includes haptic information in step S109. In this case, the network server 200 may identify a code value relating to haptic information by checking the Progress Indicator field or the User-defined field of the received message.

When the received message includes haptic information, the network server 200 analyzes the haptic information in step S111. In this case, the network server 200 may analyze vibration information corresponding to the haptic information based on information on the first mobile terminal 100, which has been stored in the database thereof. For example, when a code value corresponding to the haptic information is "01010101," the network server 200 may determine that the haptic information corresponds to information to generate vibration at intervals of one second, and when a code value corresponding to the haptic information is "00001000," the network server 200 may determine that the haptic information corresponds to information to generate vibration at intervals of four seconds.

When the haptic information has been analyzed, the network server 200 may generate a vibration code corresponding to the haptic information in step S113. In this case, the vibration code has a code value, into which the haptic information is converted, the haptic information is related to vibration that can be set up in the second mobile terminal 300 that is, in this illustrated case, a recipient mobile terminal. The vibration code may be expressed by an 8-bit binary number. For example, based on a vibration code table stored in the database, when the haptic information corresponds to the code value of "01010101," the network server 200 may convert the vibration code value into "10101010," and when the haptic information corresponds to the code value of "00001000," the network server 200 may convert the vibration code value into "11110111." However, it would be recognized that other conversions, translations or transpositions of the received haptic information into vibration code may be implied. Such other conversions, translations or transpositions may be determined based on the characteristics of the receiving terminal 300. In addition, while the example provided herein illustrates an 8-bit code value (corresponding to the haptic information) and an 8-bit vibration code, it would be recognized that the number of bits in either the haptic code value or the vibration code may be different and the conversion, translation or transposition performed provides appropriate conversion of the input information to the output information.

When a vibration code has been generated, the network server 200 can insert the vibration code into a call setup request message, and transmit the call setup request message including the vibration code to the second mobile terminal 300 in step S115. In this case, among fields of the call setup request message, a Progress Indicator field or a User-defined field may be used as a specified field including the vibration code.

When receiving the call setup request message, the second mobile terminal 300 analyzes fields of the received call setup request message in step S117. Here, the second mobile terminal 300 may analyze the Progress Indicator field or the User-defined field of the call setup request message. In this case, the second mobile terminal 300 may check a vibration code included in the analyzed field. For example, when a vibration code value included in the analyzed field is "10101010," the second mobile terminal 300 may determine that the vibration code value corresponds to a code value to generate vibration at intervals of one second, and when a vibration code value included in the analyzed field is "11110111," the second mobile terminal 300 may determine that the vibration code value corresponds to a code value to generate vibration at intervals of four seconds.

When the vibration code value has been analyzed, the second mobile terminal 300 can execute a haptic function according to a corresponding vibration code in step S119. In this case, the second mobile terminal 300 executes a haptic function according to preset haptic function operation modes. For example, when the haptic function's operation mode has been set to a standby mode, the second mobile terminal 300 may hold the haptic function until a ring tone starts to play, and may output a corresponding vibration when the ring tone starts to play. Also, when the haptic function's operation mode has been set to a preliminary execution mode, the second mobile terminal 300 may set the haptic function in such a manner as to execute the haptic function before a ring tone is output, and to release the haptic function after the ring tone is played.

Figure 2:
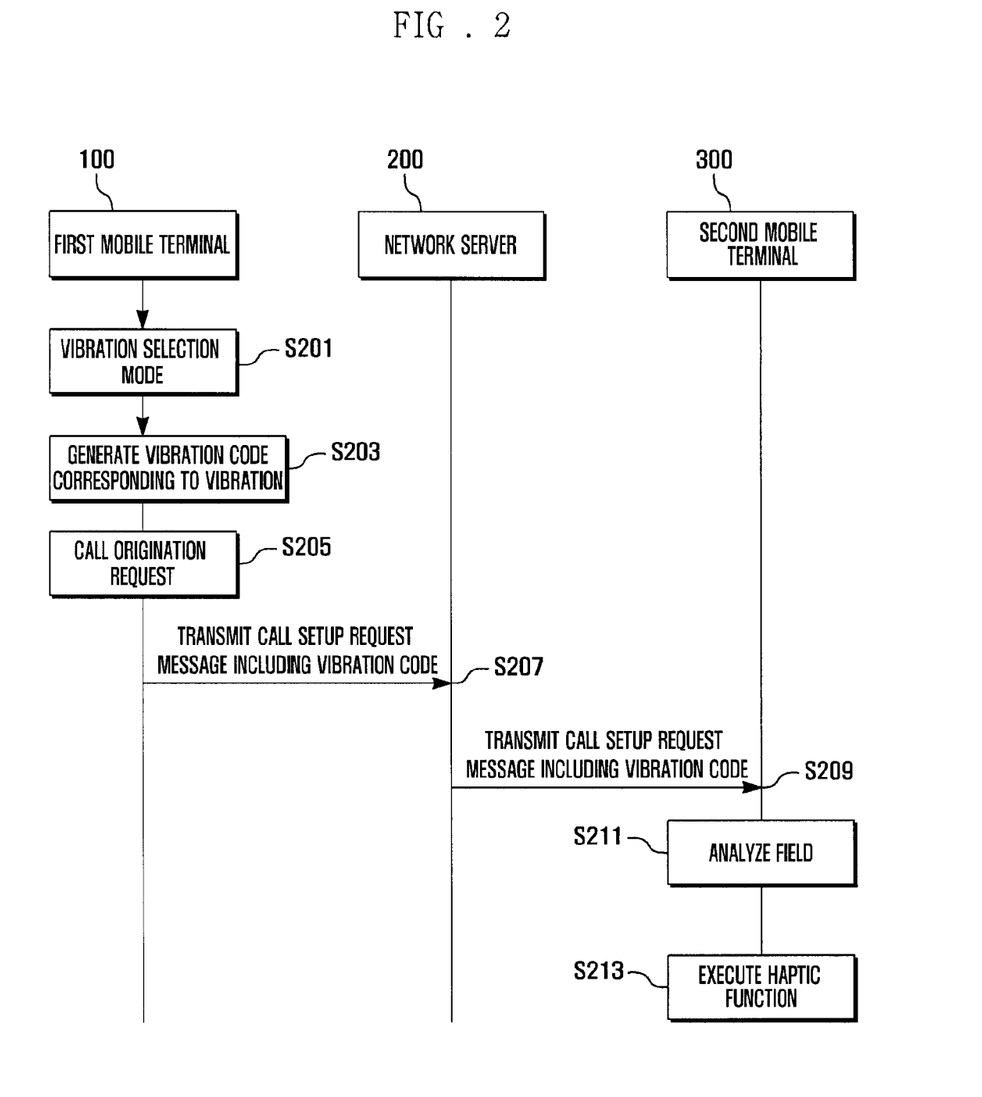
FIG. 2 illustrates a procedure of setting and providing a haptic function by a first mobile terminal according to an exemplary embodiment of the present invention.

FIG. 2 illustrates a procedure of setting and providing a haptic function by a first mobile terminal according to an exemplary embodiment of the present invention.

Referring to FIG. 2, a system according to an exemplary embodiment of the present invention may include a first mobile terminal 100, a network server 200, and a second mobile terminal 300. In this case, the first mobile terminal 100 may be a sender mobile terminal which can perform functions of registering a haptic service, selecting vibration applied to a haptic function, generating a vibration code corresponding to the selected vibration, requesting a call origination, etc. Also, the first mobile terminal 100 may store information relating to the haptic function, such as a vibration code corresponding to a vibration selected by the user. In this case, the first mobile terminal 100 may store vibration-related data in the form of matching or linking the vibration-related data to the respective corresponding vibration codes according to the kinds of vibrations.

The network server 200 may receive a call setup request message from the first mobile terminal 100, and transmit the received call setup request message to the second mobile terminal 300. The second mobile terminal 300 can analyze a vibration code included in a call setup request message received from the network server 200 and execute a corresponding haptic function.

With reference to FIG. 2, the first mobile terminal 100 executes a process of selecting a vibration to be used for a haptic function in step S201. In the step of selecting a vibration, the user of the first mobile terminal 100 may select a desired vibration according to the degree of urgency of a call origination request, the feeling of the user, a change of the user's preference, etc.

When a vibration has been selected, the first mobile terminal 100 can generate a vibration code corresponding to the vibration in step S203. In this case, the vibration code corresponds to a code value which is generated to enable the vibration to be set in the second mobile terminal 300 that is a recipient mobile terminal. The vibration code may be expressed by an 8-bit binary number (or other number depending, for example, on the degree of resolution desired, the capability of the mobile terminal(s) or the number of bits in the call request setup message. For example, when the user has selected to generate vibration at intervals of one second, a vibration code value of "10101010" may be generated. On the other hand, when the user has selected to generate vibration at intervals of four seconds, a vibration code value of "11110111" may be generated.

When the vibration code has been generated, the first mobile terminal 100 may sense a call origination request signal input by the user in step S205. In this case, the call origination request signal may include a signal such as an input of a call key. Here, a call origination request may be a general voice call request or video call request.

When receiving a call origination request, the first mobile terminal 100 inserts the vibration code into a call setup request message and transmits the call setup request message including the vibration code to the network server 200 in step S207. In this case, among fields of the call setup request message, a Progress Indicator field or a User-defined field may be used as a specified field including the vibration code.

When receiving the call setup request message, the network server 200 may transmit the received call setup request message to the second mobile terminal 300 in step S209.

When receiving the call setup request message, the second mobile terminal 300 analyzes fields of the received call setup request message in step S211. Here, the second mobile terminal 300 may analyze the Progress Indicator field or the User-defined field of the call setup request message. In this case, the second mobile terminal 300 may check a vibration code included in the analyzed field. For example, when a vibration code value included in the analyzed field is "10101010," the second mobile terminal 300 may determine that the vibration code value corresponds to a code value to generate vibration at intervals of one second, and when a vibration code value included in the analyzed field is "11110111," the second mobile terminal 300 may determine that the vibration code value corresponds to a code value to generate vibration at intervals of four seconds.

When the vibration code value has been analyzed, the second mobile terminal 300 can execute a haptic function according to a corresponding vibration code in step S213. In this case, the second mobile terminal 300 executes a haptic function according to preset haptic function operation modes. For example, when the haptic function's operation mode has been set to a standby mode, the second mobile terminal 300 may hold the haptic function until a ring tone starts to play, and may output a corresponding vibration when the ring tone starts to play. Also, when the haptic function's operation mode has been set to a preliminary execution mode, the second mobile terminal 300 may set the haptic function in such a manner as to execute the haptic function before a ring tone is output, and to release the haptic function after the ring tone is played.

Figure 3:
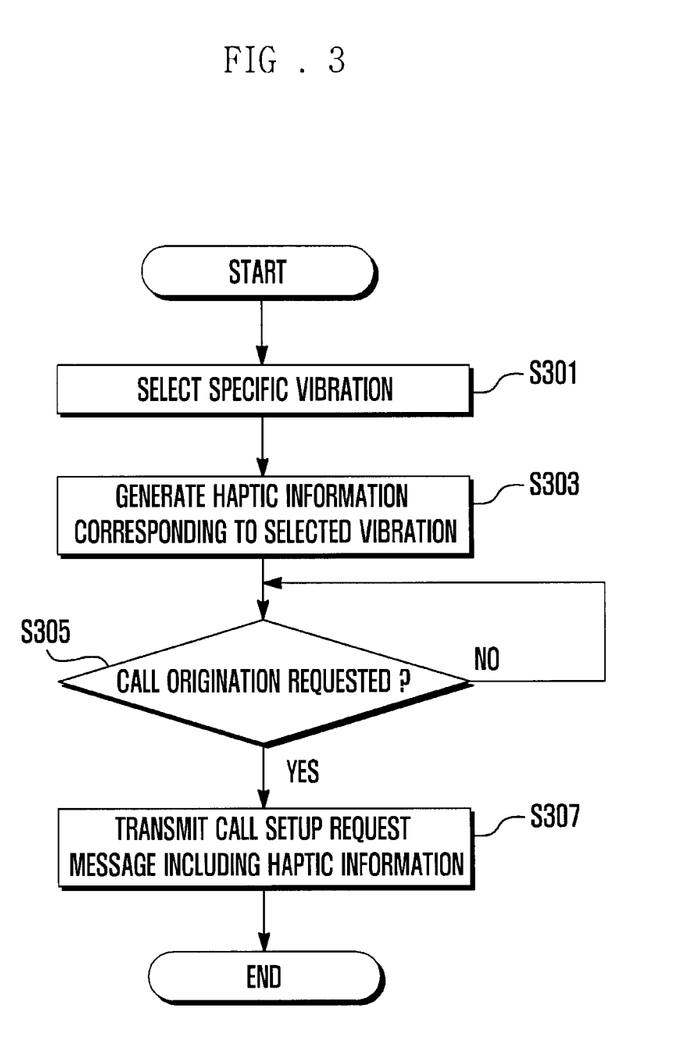
FIG. 3 is a flowchart illustrating the operation of a first mobile terminal when a haptic function is set by a network server according to an exemplary embodiment of the present invention.
Figure 5A:
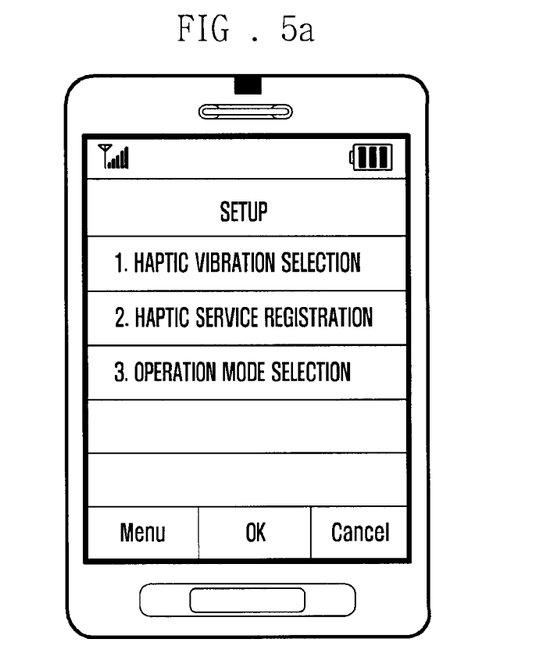
FIGS. 5A and 5B illustrate screens displayed during a setup process for executing a haptic function according to an exemplary embodiment of the present invention.
Figure 5B:
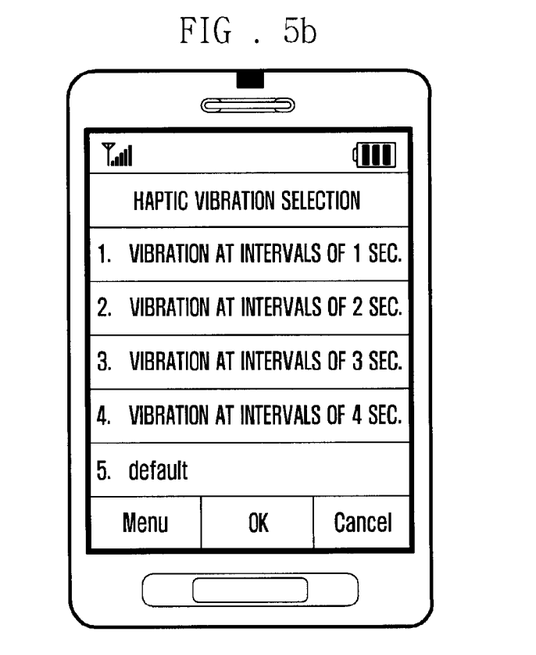

FIG. 3 is a flowchart explaining the operation procedure of a first mobile terminal when a haptic function is set by a network server according to an exemplary embodiment of the present invention, as is shown in FIG. 1. FIGS. 5A and 5B illustrate screens displayed in a setup process for executing a haptic function according to an exemplary embodiment of the present invention.

Referring to FIGS. 3, 5A and 5B, the first mobile terminal 100 may execute a process of selecting a specific vibration in step S301 in order to use a haptic service. In this case, the specific vibration represents a vibration that is used for a haptic function and can be executed for a haptic function in a recipient's mobile terminal. For example, the first mobile terminal 100 displays a setup list for a haptic service on a screen, as shown in FIG. 5A. Here, when an item of "1. Haptic Vibration Selection" is selected by the user, the first mobile terminal 100 executes a setup process for the haptic vibration selection. Referring to FIG. 5B, the first mobile terminal 100 may set the vibration for the haptic function to be generated at intervals of one second when an item of "1. Vibration at Intervals of 1 second" is selected; set the vibration for the haptic function to be generated at intervals of two seconds when an item of "2. Vibration at Intervals of 2 seconds" is selected; set the vibration for the haptic function to be generated at intervals of three seconds when an item of "3. Vibration at Intervals of 3 seconds" is selected; set the vibration for the haptic function to be generated at intervals of four seconds when an item of "4. Vibration at Intervals of 4 seconds" is selected; and set the vibration for the haptic function to vibration set by the first mobile terminal 100 or vibration used for a previous haptic service when an item of "5. Default" is selected.

When a specific vibration has been selected, the first mobile terminal 100 can generate haptic information corresponding to the selected vibration in step S303. In this case, the haptic information corresponds to vibration information selected by the user, and may be set, for example, as an 8-bit binary code value. For example, if the item "1 Vibration at Intervals of 1 second," is selected then a value of "01010101" is included in the call setup request message.

When the haptic information has been generated, the first mobile terminal 100 determines if an input signal requesting a call origination is sensed in step S305. In this case, when the input signal is sensed, the first mobile terminal 100 may insert the haptic information into a specified field of a call setup request message and transmit the call setup request message including the haptic information to the network server 200 in step S307. In this case, the haptic information may be included in a Progress Indicator field or a User-defined field among the fields of the call setup request message that is to be transmitted.

Figure 4:
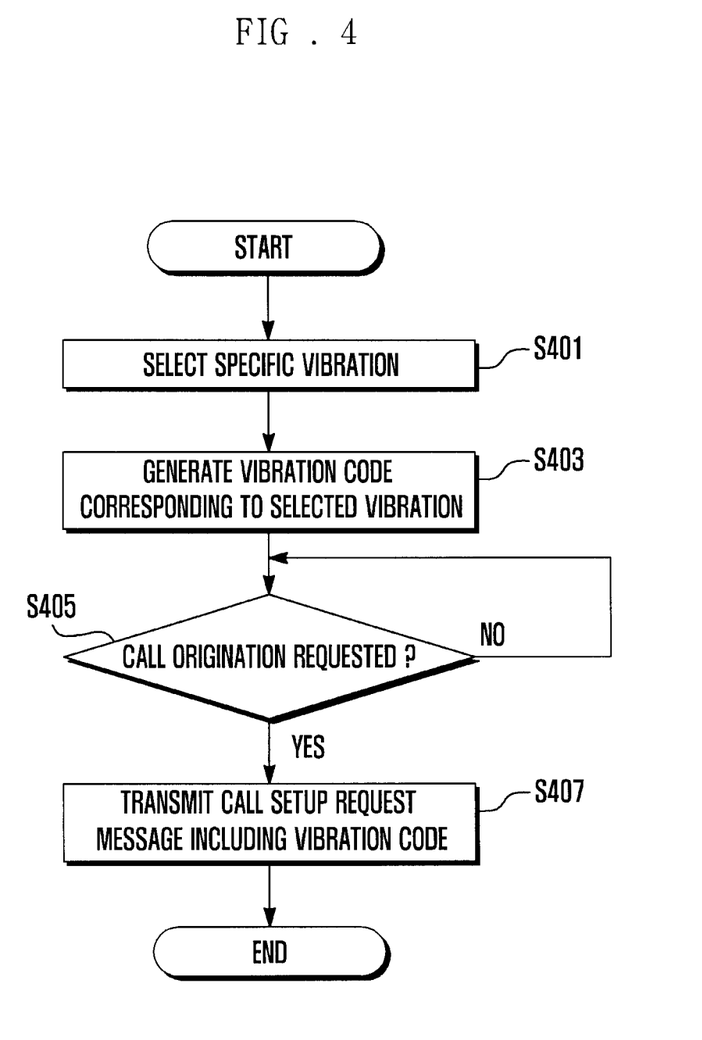
FIG. 4 is a flowchart illustrating the operation of a first mobile terminal setting a haptic function according to an exemplary embodiment of the present invention.

FIG. 4 is a flowchart illustrating the operation procedure when a haptic function is set by a first mobile terminal according to an exemplary embodiment of the present invention.

Referring to FIGS. 4, 5A and 5B, the first mobile terminal 100 may execute a process of selecting a specific vibration in step S401 in order to use a haptic service. In this case, the specific vibration represents vibration which is used for a haptic function and can be executed for a haptic function in a recipient mobile terminal. For example, the first mobile terminal 100 displays a setup list for a haptic service on a screen, as shown in FIG. 5A. Here, when an item of "1. Haptic Vibration Selection" is selected by the user, the first mobile terminal 100 executes a setup process for the haptic vibration selection. That is, in a haptic vibration selection process, as shown in FIG. 5B, the first mobile terminal 100 may set the vibration for the haptic function to be generated at intervals of one second when an item of "1. Vibration at Intervals of 1 second" is selected; set the vibration for the haptic function to be generated at intervals of two seconds when an item of "2. Vibration at Intervals of 2 seconds" is selected; set the vibration for the haptic function to be generated at intervals of three seconds when an item of "3. Vibration at Intervals of 3 seconds" is selected; set the vibration for the haptic function to be generated at intervals of four seconds when an item of "4. Vibration at Intervals of 4 seconds" is selected; and set the vibration for the haptic function to vibration set in the first mobile terminal 100 or vibration used for a previous haptic service when an item of "5. Default" is selected.

When a specific vibration has been selected, the first mobile terminal 100 can generate a vibration code corresponding to the selected vibration in step S403. In this case, the vibration code corresponds to a code value which is generated to enable vibration to be set in the second mobile terminal 300, i.e., a recipient mobile terminal, and may be expressed by an 8-bit binary number. For example, if the item "1. Vibration at Intervals of 1 second," is selected then a value of "10101010" is included in the call setup request message.

When the vibration code has been generated, the first mobile terminal 100 determines if an input signal of requesting a call origination is sensed in step S405. In this case, when the input signal is sensed, the first mobile terminal 100 may insert the vibration code into a specified field of a call setup request message and transmit the call setup request message including the vibration code to the network server 200 in step S407. In this case, the vibration code may be included in a Progress Indicator field or a User-defined field among fields of the call setup request message, and be transmitted. Note that, in FIG. 1, the network server receives haptic information from the first mobile terminal, and performs converting the received haptic information into vibration code. In FIG. 2, the network server receives vibration code from the first mobile terminal, and does not perform converting the received haptic information into vibration code. Hence, converting haptic information into vibration code is performed by the first mobile terminal beforehand. An algorithm that converts haptic information into vibration code is necessary. In FIG. 1, the algorithm is included in the network server, and in FIG. 2, the algorithm is included in the first mobile terminal.

Figure 6:
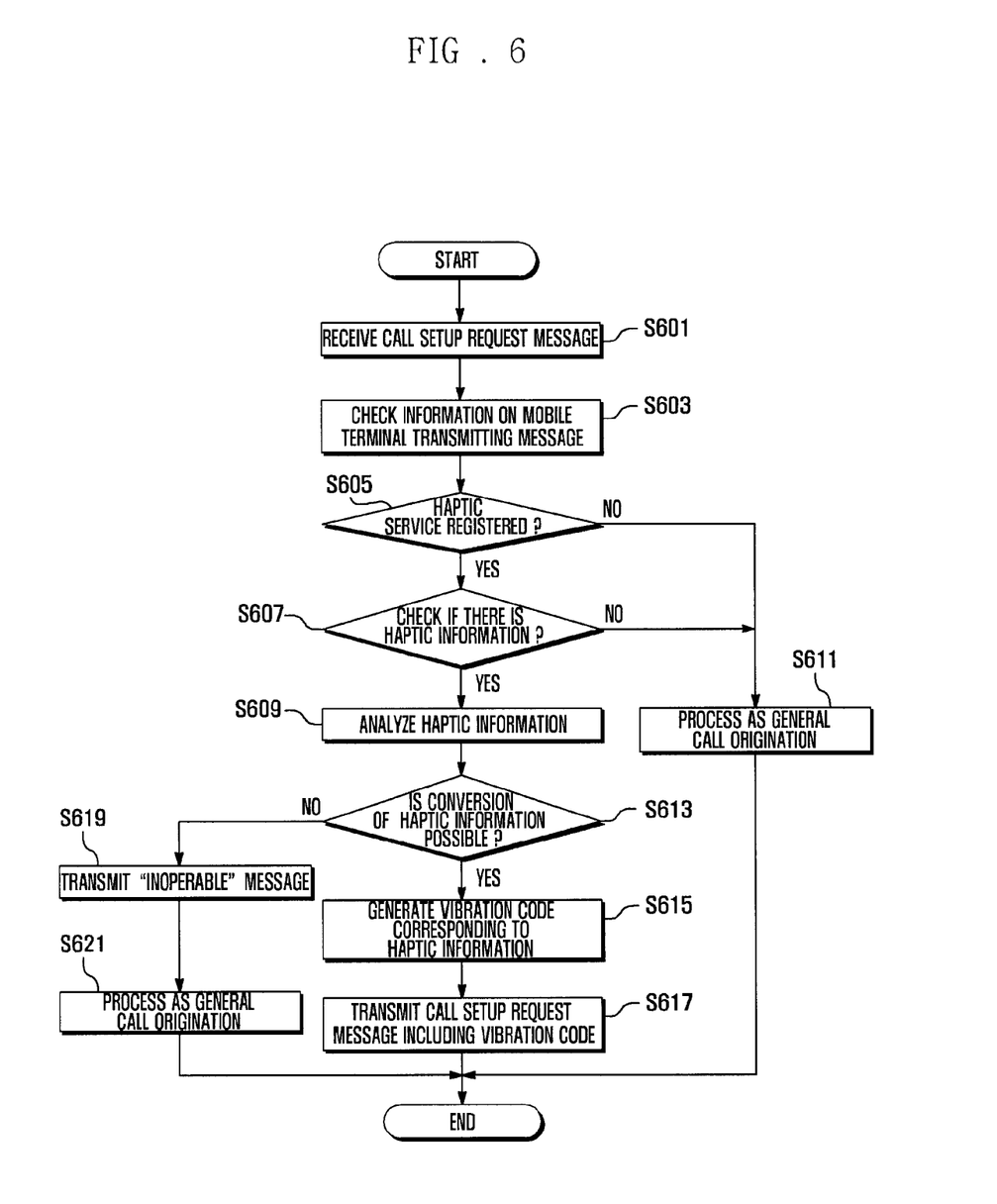
FIG. 6 is a flowchart illustrating the operation of a network server according to an exemplary embodiment of the present invention.
Figure 7:
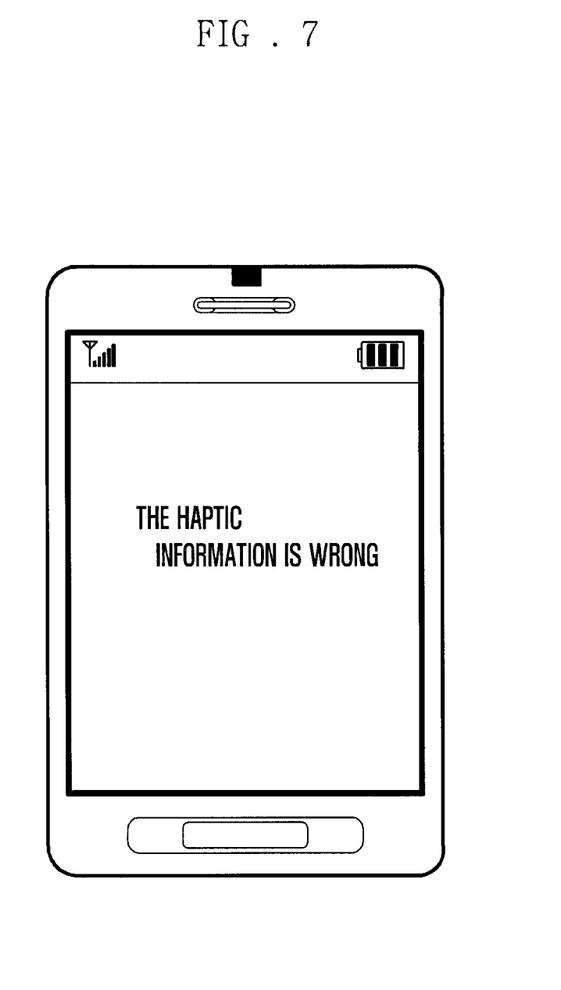
FIG. 7 illustrates a screen of a first mobile terminal explaining the operation procedure of the network server according to an exemplary embodiment of the present invention.

FIG. 6 is a flowchart illustrating the operation of a network server according to an exemplary embodiment of the present invention, and FIG. 7 illustrates a screen of a first mobile terminal in order to explain the operation procedure of the network server according to an exemplary embodiment of the present invention.

Referring to FIGS. 6 and 7, the network server 200 receives a call setup request message from the first mobile terminal 100 in step S601. In this case, when receiving the call setup request message, the network server 200 checks whether the first mobile terminal 100 having transmitted the message has joined the haptic service in step S603. The network server 200 can determine if the first mobile terminal 100 has joined the haptic service by checking information regarding the mobile terminals, which may be stored in a database.

When the first mobile terminal 100 has joined the haptic service, the network server 200 determines whether the first mobile terminal 100 has registered for the haptic service in step S605. In this case, when the first mobile terminal 100 has not registered for the haptic service, the network server 200 may process the call setup request message as a general call origination, and transmit the call setup request message to the second mobile terminal 300 in step 611. In contrast, when the first mobile terminal 100 has registered for the haptic service, the network server 200 determines if the call setup request message includes haptic information in step S607. Here, the network server 200 may check a Progress Indicator field or a User-defined field in order to determine if there is haptic information included or indicated. When the call setup request message includes haptic information, the network server 200 analyzes the haptic information in step S609. In contrast, when the call setup request message does not include haptic information, the network server 200 may process the call setup request message as a general call origination, and transmit the call setup request message to the second mobile terminal 300 in step 611.

When the haptic information has been analyzed in step S609, the network server 200 determines if conversion of the haptic information is possible in step S613 in order to check if the haptic information included in the field corresponds to a normal code value. In this case, when conversion of the haptic information is possible, the network server 200 can generate a vibration code corresponding to the haptic information in step S615. In this case, the vibration code corresponds to a code value which is generated to enable vibration to be set in the second mobile terminal 300.

When the vibration code has been generated, the network server 200 may insert the vibration code into a call setup request message, and transmit the call setup request message including the vibration code to the second mobile terminal 300 in step S617. In this case, among fields of the call setup request message, a Progress Indicator field or a User-defined field may be used as a specified field including the vibration code.

However, when it is determined in step S613 that conversion of the code value of the haptic information is impossible, the network server 200 may transmit a message indicating operational impossibility of the haptic service to the first mobile terminal 100 in step S619. For example, the network server 200 may transmit a corresponding message so that a pop-up window showing the text "the haptic information is wrong" can be output on the screen of the first mobile terminal 100, as shown in FIG. 7. Next, the network server 200 processes the call setup request message as a general call origination in step S621.

Figure 8:
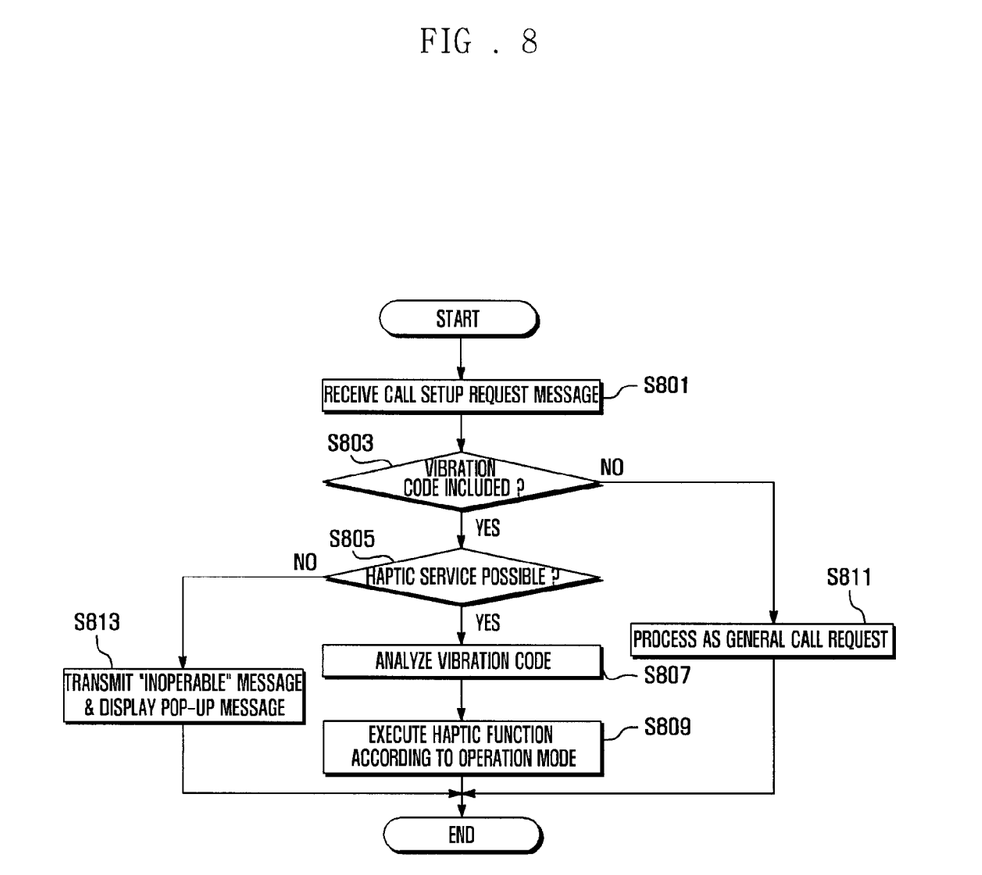
FIG. 8 is a flowchart illustrating the operation of a second mobile terminal according to an exemplary embodiment of the present invention.
Figure 9A:
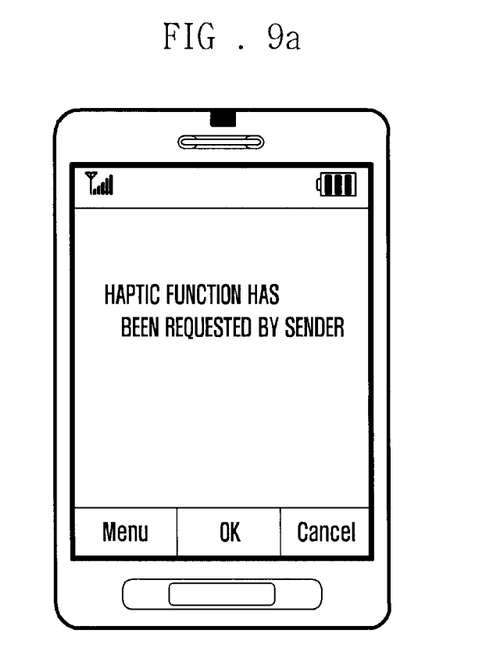
FIGS. 9A and 9B illustrate screens for showing an operational mode selection procedure of a haptic function according to an exemplary embodiment of the present invention.
Figure 9B:
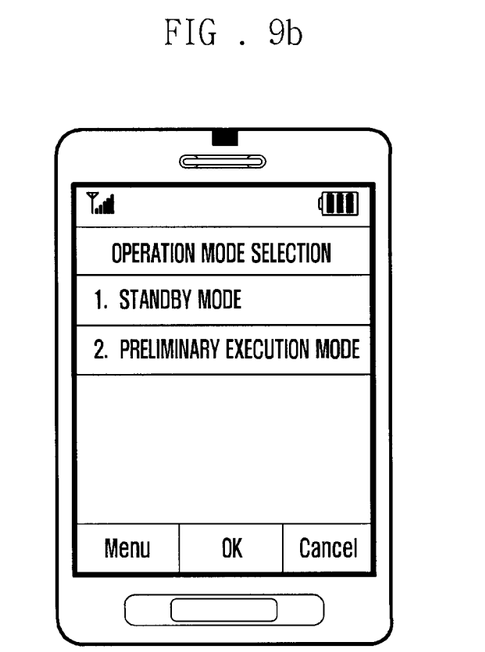

FIG. 8 is a flowchart illustrating the operation of a second mobile terminal according to an exemplary embodiment of the present invention, and FIGS. 9A and 9B are views illustrating screens for showing an operation mode selection procedure for a haptic function according to an exemplary embodiment of the present invention.

Referring to FIGS. 8, 9A and 9B, the second mobile terminal 300 receives a call setup request message from the network server 200 in step S801.

When receiving the call setup request message, the second mobile terminal 300 determines if the received call setup request message includes a vibration code in step S803. In this case, the second mobile terminal 300 may determine if there is a vibration code in a field of the received message. Here, the vibration code corresponds to a code into which haptic information is converted, and refers to a code generated so that vibration can be set in the second mobile terminal 300, which is a recipient mobile terminal.

When the received call setup request message includes a vibration code, the second mobile terminal 300 determines if a haptic service can be executed in step S805. That is, the second mobile terminal 300 determines if a haptic function can be executed according to the vibration code received through the call setup request message. In contrast, when the received call setup request message does not include a vibration code, the second mobile terminal 300 may process the call setup request message as a general call request in step S811.

When it is determined in step S805 that the haptic service can be executed, the second mobile terminal 300 may analyze a vibration code included in the call setup request message in step S807. In this case, the vibration code may be included in a Progress Indicator field or a User-defined field. In contrast, when it is determined in step S805 that the haptic service cannot be executed, the second mobile terminal 300 transmits an "inoperable" message to the first mobile terminal 100. In addition, the second mobile terminal 300 may display a pop-up message of the haptic information in step S813. For example, the second mobile terminal 300 may display a message saying that "A haptic function has been requested by a sender." on the screen thereof, as shown in FIG. 9A.

When the vibration code has been analyzed in step S807, the second mobile terminal 300 executes a haptic function according to a haptic function's operation mode set in the second mobile terminal in step S809. For example, as shown in FIG. 9B, the second mobile terminal 300 may execute a haptic function according to a standby mode when the haptic function's operation mode is set to "1. Standby Mode," and the second mobile terminal 300 may execute a haptic function according to an preliminary execution mode when the haptic function's operation mode is set to "2. Preliminary Execution Mode." The operation modes according to an exemplary embodiment of the present invention will be described in detail with reference to FIG. 10.

Figure 10:
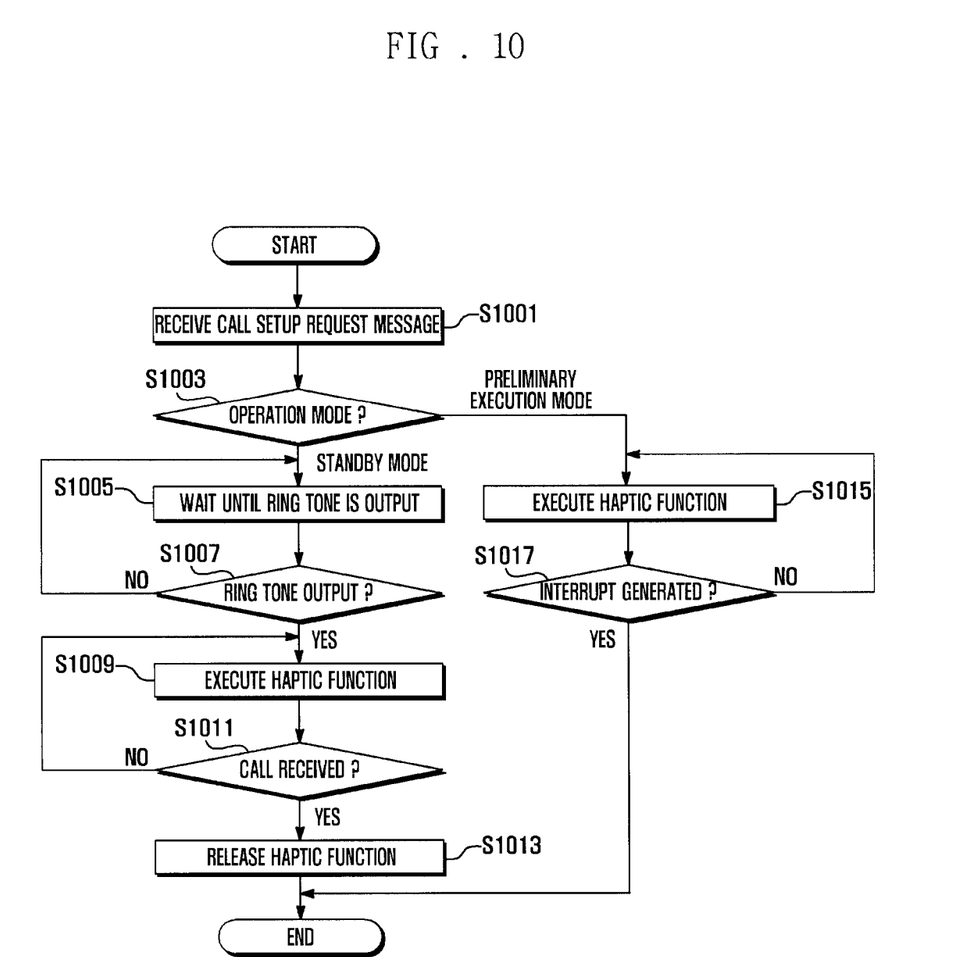
FIG. 10 is a flowchart illustrating a procedure of executing a haptic function based on the operation modes of the second mobile terminal according to an exemplary embodiment of the present invention.

FIG. 10 is a flowchart illustrating a procedure of executing a haptic function based on the operation modes of the second mobile terminal according to an exemplary embodiment of the present invention.

Referring to FIG. 10, the second mobile terminal 300 receives a call setup request message from the network server 200 in step S1001. Then, the second mobile terminal 300 determines if an operation mode for a haptic function has been set to a standby mode in step S1003.

When the operation mode for the haptic function has been set to a standby mode, the second mobile terminal 300 is maintained in the standby mode in step S1005 until a ring tone is output according to a vibration code included in the call setup request message. Here, the second mobile terminal 300 can set and use as an output means at least one among a vibration mode, a lamp mode, and a silence mode, as well as a ring tone. In the case where the output means is set to the vibration mode, when a haptic function is executed, vibration according to the haptic function may be executed first instead of outputting vibration according to the vibration mode.

The second mobile terminal 300 determines if a signal corresponding to an output of a ring tone is sensed during execution of the standby mode in step S1007. In this case, when a signal corresponding to an output of a ring tone is sensed, the second mobile terminal 300 executes a haptic function in step S1009. Here, the second mobile terminal 300 may execute a vibration corresponding to the vibration code included in the call setup request message. That is, the second mobile terminal 300 may execute a haptic function corresponding to a vibration set by the user of the first mobile terminal 100. Meanwhile, when a ring tone is not output, the second mobile terminal 300 is maintained in the standby mode, instead of executing the haptic function.

While executing the haptic function, the second mobile terminal 300 may determine if a user's input signal to receive a call is sensed in step S1011. In this case, when the user's input signal to receive a call is sensed, the second mobile terminal 300 releases the operation for the haptic function in step S1013. In contrast, when the user's input signal to receive a call is not sensed, the second mobile terminal 300 may continue to execute the haptic function.

Meanwhile, when the operation mode for the haptic function has been set to a preliminary execution mode in step S1003, the second mobile terminal 300 executes the haptic function according to a vibration code included in the call setup request message in step S1015. In this case, while the haptic function is being executed, the second mobile terminal 300 may sense if an interrupt is generated in step S1017. For example, the interrupt may include an output means, for which at least one among a vibration mode, a lamp mode, and a silence mode, as well as a ring tone, may be set. In the case where the output means is set to the vibration mode, when a haptic function is executed, a vibration according to the haptic function may be executed first instead of outputting a vibration according to the vibration mode. Here, when an interrupt is generated, the second mobile terminal 300 terminates the function for the call reception. In contrast, when no interrupt is generated, the second mobile terminal 300 continues to perform the haptic function.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

Although exemplary embodiments of the present invention have been described in detail hereinabove, it should be clearly understood that many variations and modifications of the basic inventive concepts herein described, which may be apparent to those skilled in the art, will still fall within the spirit and scope of the exemplary embodiments of the present invention as defined in the appended claims.

According to the present invention, the user selects and transmits a specific vibration to a recipient mobile terminal through a network server, so that a haptic function corresponding to the specific vibration can be executed in the recipient mobile terminal when a call is received by the recipient mobile terminal.

In addition, a haptic function of enabling the degree of urgency and/or the sender of a received call to be identified can be executed in the recipient mobile terminal.

What is claimed is:

1. A method for transmitting a haptic function at a network server in a mobile communication system, the method comprising:
    determining, when a call setup request message is received from a first mobile terminal, whether the first mobile terminal has registered for a haptic service based on information on the first mobile terminal;
    checking, when the first mobile terminal has registered for the haptic service, whether the call setup request message includes haptic information corresponding to a selected vibration by the first mobile terminal;
    determining whether conversion of the haptic information is possible according to a result of the check;
    generating a vibration code by converting the haptic information to the vibration code when conversion of the haptic information is possible;
    inserting the vibration code into the call setup request message; and
    transmitting the call setup request message to at least one second mobile terminal such that
the at least one second mobile terminal executes a corresponding haptic function according to the vibration code included in the call setup request message.

2. The method of claim 1, wherein the haptic information includes information on vibration.

3. The method of claim 1, wherein the first mobile terminal:
    generates the haptic information corresponding to the vibration;
    senses a call origination request signal when the haptic information is generated; and
    inserts the haptic information into a specified field of the call setup request message when the call origination request signal is sensed.

4. The method of claim 1, further comprising transmitting an "inoperable" message for the haptic function to the first mobile terminal when conversion of the haptic information is impossible.

5. A network server for providing a haptic function comprising:
- a database for storing a vibration code corresponding to a haptic function for a mobile terminal; and
- a controller for determining, when a call setup request message is received from a first mobile terminal, whether the first mobile terminal has registered for a haptic service based on information on the first mobile terminal; checking, when the first mobile terminal has registered for the haptic service, whether the call setup request message includes haptic information corresponding to a selected vibration by the first mobile terminal; determining whether conversion of the haptic information is possible according to a result of the check; generating a vibration code by converting the haptic information to the vibration code when conversion of the haptic information is possible; inserting the vibration code into the call setup request message; and transmitting the call setup request message to at least one second mobile terminal such that the at least one second mobile terminal executes a corresponding haptic function according to the vibration code included in the call setup request message.

6. The system network server of claim 5, wherein the haptic information includes information on a vibration that is set in the first mobile terminal for the sake of executing a haptic function in the second mobile terminal.

7. The network server of claim 5, wherein the haptic information
is generated corresponding to the vibration and inserted into a specific field of the call setup request message when a call origination request signal is sensed, by the first mobile terminal.

8. The network server of claim 5, wherein the network server transmits an "inoperable" message to the first mobile terminal when conversion of the haptic information is impossible.

9. The network server system of claim 5, wherein the call setup request message includes a vibration code inserted by the first mobile terminal, and the call setup request message is transmitted to the network server when a haptic service is executed in the first mobile terminal.

10. The network server of claim 5, wherein the call setup request message includes a vibration code that is generated corresponding to the vibration by the first mobile terminal in order to set up the haptic function.

* * * * *

UNITED STATES PATENT AND TRADEMARK OFFICE
CERTIFICATE OF CORRECTION

PATENT NO. : 8,494,497 B2
APPLICATION NO. : 12/775542
DATED : July 23, 2013
INVENTOR(S) : Jong Won Seo et al.

Page 1 of 1

It is certified that error appears in the above-identified patent and that said Letters Patent is hereby corrected as shown below:

In the Claims:

Column 14, Claim 6, Line 1 should read as follows:
--...The network server of claim 5...--

Column 14, Claim 9, Line 15 should read as follows:
--...The network server of claim 5...--

Signed and Sealed this
Seventeenth Day of September, 2013

Teresa Stanek Rea
*Deputy Director of the United States Patent and Trademark Office*